United States Patent [19]
Greve

[11] Patent Number: 6,142,295
[45] Date of Patent: Nov. 7, 2000

[54] CURVED PATH CHAIN LINK CONVEYOR MODULES AND BELTS

[75] Inventor: Christopher G. Greve, Covington, La.

[73] Assignee: The Laitram Corporation, Harahan, La.

[21] Appl. No.: 09/038,914

[22] Filed: Mar. 12, 1998

[51] Int. Cl.[7] ............................ B65G 17/06; B65G 17/38
[52] U.S. Cl. .......................................... 198/852; 198/853
[58] Field of Search .................................. 198/845, 852, 198/853

[56] References Cited

U.S. PATENT DOCUMENTS

| | | |
|---|---|---|
| 3,627,109 | 12/1971 | Cabak . |
| 4,645,070 | 2/1987 | Homeier . |
| 4,754,872 | 7/1988 | Damkjaer . |
| 5,027,944 | 7/1991 | Damkjaer ................................ 198/852 |
| 5,139,135 | 8/1992 | Irwin et al. ............................. 198/852 |
| 5,271,491 | 12/1993 | Irwin .................................. 198/852 X |
| 5,404,997 | 4/1995 | Schreier et al. . |
| 5,489,020 | 2/1996 | Clopton . |
| 5,697,492 | 12/1997 | Damkjaer . |

*Primary Examiner*—Christopher P. Ellis
*Assistant Examiner*—Gene O. Crawford
*Attorney, Agent, or Firm*—Laurence R. Brown; James T. Cronvich

[57] ABSTRACT

A chain link conveyor belt carries lateral slats extending from the chain links, upon which are formed integral ribbed finger load carrying platform structure that interdigitates and overlaps their ribbed fingers with leading and trailing chain links in a conveyor belt. Wider belts are feasible when a parallel pair of spaced chains support the lateral slats extending horizontally from the chain links to the belt edges. The chain links are Y-shaped with elongated pivot rod slots in the leg to permit flexibility for laterally pivoting the belt around curved paths. Specially shaped structure on the slats near the belt edges supports long finger tip ribs of adjacent slats, thereby to strengthen the edge portions of the belt. The outermost fingers are reinforced to slide on guide rails. The trailing ribbed fingers diverge inwardly from the belt edges to avoid interference and fracture. In a typical embodiment, the belt modules are integrally molded of plastic with ribs about 1/16th inch thick and 1/4 inch high, slats about 1/4 inch thick and about 24 inches long, with two chain links having the slats disposed on their upper surface and being about 8 inches apart and 8 inches from the belt edges at the ends of the slats. The belt is supported in a wear pan, preferably made from UHMW plastic, and the chains serve to retain the belt snug on the pan surface. Multiple chain drives are of particular advantage in handling greater loads on the drive system. Light weight plastic chain links are significantly advantageous in reducing drive power and in handling temporary overloads about curved belt transport segments.

20 Claims, 8 Drawing Sheets

CURVED PATH CHAIN LINK CONVEYOR MODULES AND BELTS

TECHNICAL FIELD

This invention relates to chain link modular conveyor belts that follow curved paths and chain link modules therefor, and more particularly it relates to chain link belts with each chain link forming a load carrying conveyor platform surface structure module integral with and extending laterally from the chain links to the edges of a belt of predetermined width significantly greater than the chain width.

BACKGROUND ART

Chain belts are known that have chain links constructed for bending around curves in a belt path as for example disclosed in U.S. Pat. No. 5,404,997, Apr. 11, 1995 to U. Schreier, et al. for ARTICLE TRANSPORTING APPARATUS INCLUDING INTERCONNECTED CHAIN PART PROVIDED WITH ROLL BODIES, which belt has a load carrying surface only as wide as the chain links.

Some chain conveyor links of the foregoing type have carried load bearing panels with intermeshing leading and trailing tooth structure, wherein the panels extend laterally beyond the chain links to increase the width of the conveyor belt, as disclosed in U.S. Pat. No. 5,489,020, Feb. 6, 1996 to R. T. Clopton for SMOOTH-DRIVING CONVEYOR CHAIN, and U.S. Pat. No. 5,697,492, Dec. 16, 1997 to P. E. Damkjaer for CONVEYOR CHAIN, wherein the panels abut and interdigitate at zig-zag shaped trailing and leading edges.

U.S. Pat. No. 3,627,109, Dec. 14, 1971, to R. E. Cabak for CONVEYOR CONSTRUCTION discloses a belt where every other chain link comprises a belt width transport panel pivoted between leading and trailing chain links which serve as pivots for permitting belt curvature. This chain is complex requiring expensive roller bearings and accompanying ride-in channel shaped tracks accomodating the chain.

Curved path conveyor chain links are also known in which the load bearing platforms extending laterally from the chain links have upwardly extending ribbed finger platform surface structure serving to overlap and interdigitate with the fingers on trailing or leading modules to form a non-continuous load bearing surface along the length of the belt, as disclosed by U.S. Pat. No. 4,754,872, Jul. 5, 1988 to P. E. Damkjaer for CONVEYER CHAIN LINK. These and other ones of the foregoing belts also tend to induce problems in providing overlapping of modules to provide a substantially continuous load transport surface without intermodule gaps, as required in many conveyor applications.

In U.S. Pat. No. 4,645,070, Feb. 24, 1987 to R. F. Homeier for DUAL BEND CONVEYOR, wherein alternate teeth on one chain link comprise load carrying platform modules forming overlapping and interdigitating teeth on leading and trailing platform module edges. This conveyor has the problem of requiring a standard bicycle like chain construction to be distorted in maneuvering curved paths. Also the chain itself cannot carry heavy transport loads required in many conveyor applications, and has the disadvantage of short lateral extensions because of a cantilevering connection of the platforms to the chain links, as do other ones of the foregoing chain type conveyor belts.

Because of the aforesaid problems, these prior art chain link conveyors have generally been used mainly for conveyor belts of narrow width because of problems such as the ability to carry unbalanced loads or heavy loads near the belt edges. For example, the platforms may tilt in response to unbalanced loads, particularly when supported substantially by the chain links along curved transport paths.

Furthermore, particularly with lighter weight plastic belts, both the ribbed finger structure and the platform structure had to be heavy and rugged to prevent fracture under dynamic belt loading conditions, and have been particularly prone to damage at belt edges where the hinges are apt to encounter flutter, frictional interference and snagging from foreign objects. Nevertheless, it is highly desirable to keep the belt platform structure light while retaining a high degree of resistance to fracture particularly in the belt edge regions at curves, where the loading is the greatest.

In light weight plastic belts having interdigitating finger structure overlapping at leading and trailing edges, there are significant problems of vibration, friction, wear, undue stresses at belt edges when encountering curves, and dynamic stresses in the chain drive links and associated pivot rods which the integrated belt structure of the known prior art systems have not adequately resolved to prevent wear and fracture of the fingers.

Thus it is an objective of this invention to resolve the aforesaid problems in chain link driven conveyor belts of significant width structured to overcome the foregoing problems, particularly when relying upon light weight plastic materials with relatively fragile interdigitating fingertip construction.

It is a particular objective of this invention to provide a long life chain belt which can stably sustain heavy loads along a curved transport path, wherein the belt is low cost and light weight, yet rugged in operation.

Other objects, features and advantages of this invention will be found throughout the following description, drawings and claims.

DESCRIPTION OF THE INVENTION

This invention provides an improved flexible conveyor belt for transporting goods over curved paths. The belt is formed from interconnected chain link modules integrally carrying conveying surface platforms laterally extending therefrom to define a belt of predetermined width. The belt is moved by transport drive means engaging chain links. The modules comprise a laterally extending slat extended across the belt width integrally sandwiched between the chain link and the belt transport surface formed of closely spaced rib fingers establishing a substantially planar and continuous conveying surface.

The rib fingers are disposed in two parallel sets of interdigitating rib fingers with finger tips extending beyond the leading and trailing edges of the slats. The two sets are disposed angularly to meet in a V at the belt center to form an apex slanting the finger tips of two rib finger sets on each modular link, thereby to dispose finger tips inwardly at the belt edges for reducing possibilities of interference and fracture.

Substantially Y-shaped chain links with pivot rod apertures in the base leg and two bifurcated arms thus pivotally nest the legs between the arms in a chain. The pivot rod aperture in the chain link legs comprises an elongated slot to provide a predetermined degree of slack in the chain thereby forming a flexible chain which also permits the belt to laterally pivot for passing over curved transport paths.

The slat is affixed integrally to the chain links to extend toward two edges of the belt from the chain links. An upper conveying belt surface is integrally formed on the slats for overlapping trailing and leading chain link modules. The conveying surface section carried by each modular link overlaps trailing and leading slat edges by interdigitating the raised rib fingers. A substantially planar and continuous platform surface thus is formed.

A substantially solid elongated slat panel has a somewhat truncated diamond shape. Thus, the slats present at trailing and leading edges rocker apexes protruding at midbelt positions and therefrom diverge inwardly forming on each side of the apexes angularly disposed substantially straight leading and trailing edges. Under tension for a straight belt path, the apexes are spaced a short distance apart by means of the pivot rod movement in the slotted aperture of the Y-chain link leg. For curved belt paths the apexes meet to provide a rocking center thus permitting slats to move closer together on an inner side of a curve and further apart on the outer side of a curve. The two diverging straight line slat edges thus abut in mating contact on an inner curvature side of the slat at a maximum curvature radius.

In a preferred embodiment, successive chain link modules have enough play between the mated leg and arm structure when linked together by a pivot rod through the slotted leg aperture, that permits a degree of lateral pivoting of the belt as it is transported about a curved path. Two or more chains preferably share the drive load since the slat is disposed across two spaced apart chain links. Thus a much wider belt width for carrying heavier loads is attainable with light weight plastic chain link modules.

For strengthening the edge portion of the belt and for permitting thin, light weight plastic rib fingers to be used in the platform with less danger of being fractured at the belt edges which endure the greatest abuse, the slat at the belt edges has toothed structure shortening rib fingertips that extend away from the slat edge. These fingertips may in some embodiments be of uniform length across the width of the belt. However in one embodiment at the belt edge regions where the fingers are more subject to interference and fracture, the slat end regions are configured with mating tooth-notch structure at leading end trailing slat edges. Resulting shorter finger tips reduce finger tip vibration, wear and the possibility of fracture. At the tooth-notch slat structure, the tooth of one slat thus abuts and mates into the mating edge notch of an adjacent slat in mating registration when the slats abut on the inner curvature of the belt. The thin rib fingers overlap the slat structure leading and trailing slat edges far enough to interdigitate with mating rib fingers on adjacent leading and trailing slat edges both in straight and curved travel paths over the width of the belt. Thus unsupported spots are eliminated and the load is supported in part by slats upon which the fingertips ride. Furthermore, this structure assures that small items cannot fall through or snag the belt, where they can cause catastrophic failure.

Typically for one embodiment of a plastic belt the ribs are about 1/16th inch thick and 1/4 inch high, slats about 1/4 inch thick and about 24 inches long, with two chain links disposed integrally on the slats about eight inches apart and eight inches from opposite belt edges.

The belt is supported along its length and rides upon a wear pan sheet typically having at least a contact surface of low friction plastic such as UHMW (ultra-high molecular weight) supported by suitable framework. Preferably guard rails at the edges also protect the fingers at the edges of the belt from snagging foreign objects, and serve to prevent relative side-to-side movement of the modules in the adjacent rows, thus restricting frictional interference during normal belt operation.

Other features and advantages will be found in the following more detailed description and accompanying drawings.

BRIEF DESCRIPTION OF THE DRAWINGS

In the accompanying drawings, wherein like reference characters represent similar features throughout the several views.

THE PREFERRED EMBODIMENT

Figure 1:
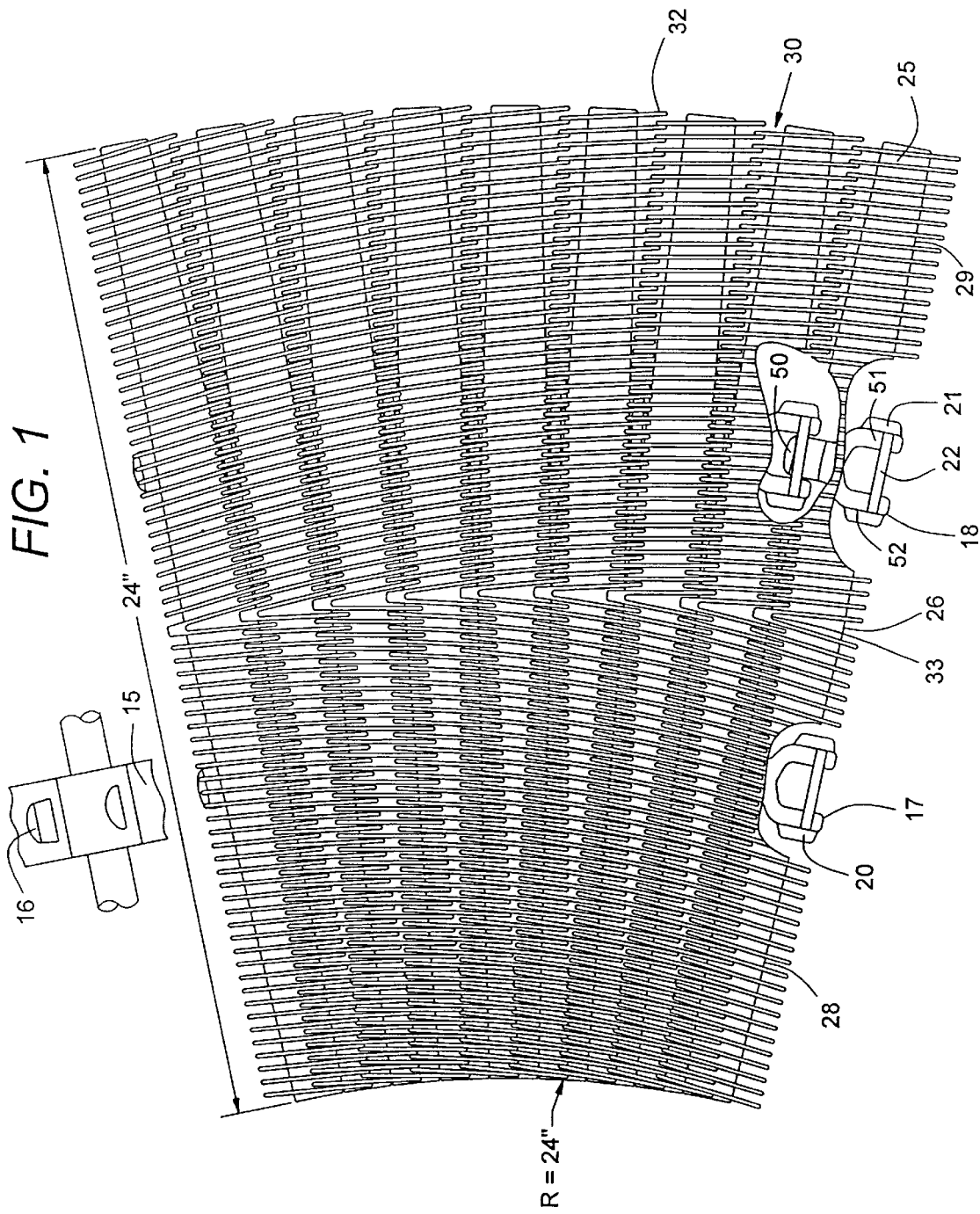
FIG. 1 is a plan view sketch, partly cut away, from the upper conveying side of a chain link coupled conveyor belt segment constructed in accordance with this invention for following a curved travel path.

Now with reference to the FIG. 1 embodiment, the shown conveyor belt section typifies a twenty-four inch wide conveyor belt that is capable of transporting loads over a curved path having a curvature not exceeding a twenty-four inch inner radius. A portion of one of the two power driven sprocket wheels 15 for rotating drive teeth 16 by engaging the drive chain 17 is diagrammatically sketched. Such sprocket wheels are located at one or more suitable locations along the conveyor belt path, preferably in a straight portion where there is no curvature of the belt. The pair of drive chains 17, 18 permit sharing of the drive loads thus permitting the modules to be of light weight plastic. This chain driven belt system thus can convey with less belt friction much larger loads over a curved path than corresponding conventional conveyor belts with pivot pins extending across the belt width, that may be made up of sets of bricklayered modular belt units narrower than the belt width, for example.

Each Y shaped chain link 20, 21, has a single short pivot rod 22 extending through the two bifurcated arms 51, 52 and the elongated slot (19, FIG. 3) in the leg portion 50 of the Y-shaped link. The loosely nested end-to-end chain links tolerate a lateral degree of pivoting action of the modular links and thus the belt for manipulating about curves. In addition the usual vertical pivoting action about the pivot rods 22 extending between the bifurcated chain link arms 51, 52 permits the belt to curve upwardly or downwardly and pass over return drive sprockets.

The dual chain drive feature is also advantageous in that it provides a more stable horizontal drive platform for the belt, which therefore is most advantageous when cantilevered belt operation is feasible. It is clear that the distance from the chain link to the edge of the belt is reduced in wider belts, and that the tendency for the belt to tilt from unbalanced loads is better handled by the dual chain embodiment. Other advantages include providing higher edge loading capabilities, where the loads are the greatest in curved belt configurations, and providing better stability from slat end flutter.

The working friction is reduced between the modular belt links, when compared with bricklayered belt configurations, by the shortened length of the pivot rods that extend only across a small portion of the belt width. The loads that can be handled at the link ends when navigating curves are significantly increased because the maximum tensile stresses are carried by the more rugged chain link couplings which are isolated from the belt edges.

Figure 2:
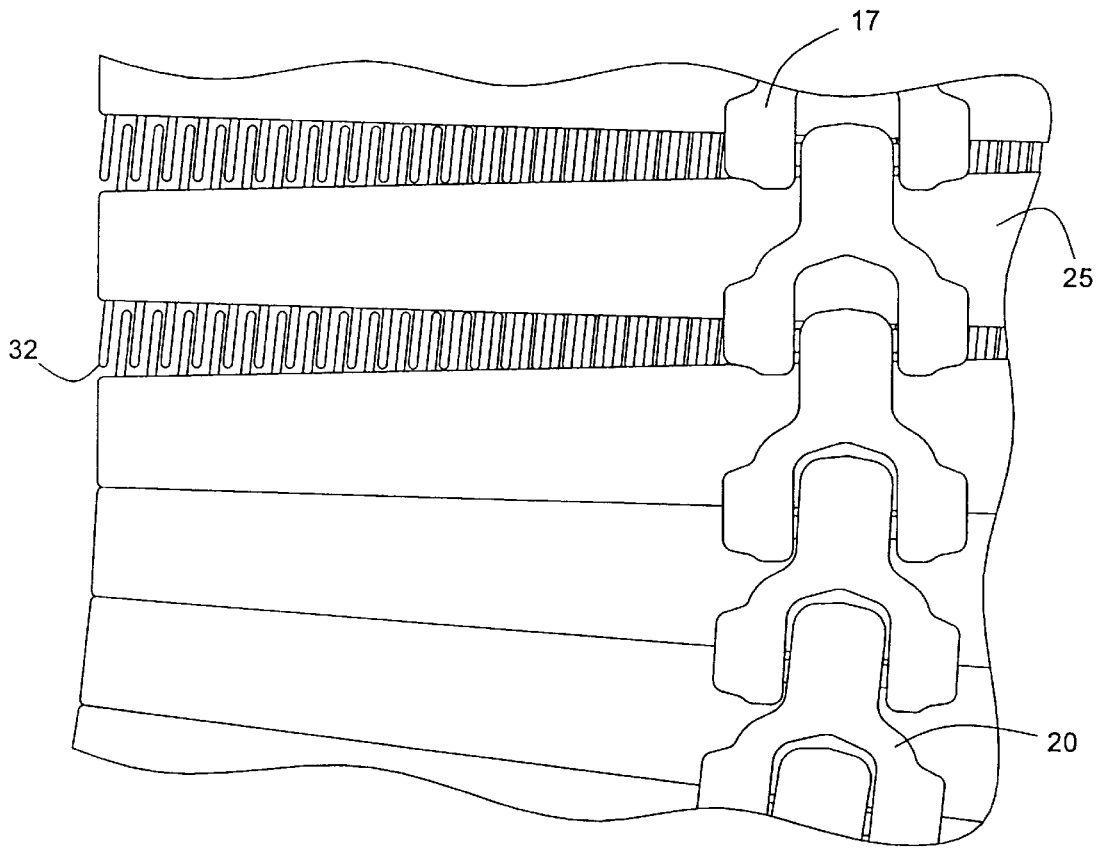
FIG. 2 is an enlarged fragmental plan view sketch of a bottom view portion of the FIG. 1 conveyor belt entering a curve at the lower end, showing the interdigitated rib fingers of a series of chain link modules.

As seen from the embodiment of FIGS. 1 and 2, the slats 25 are generally of a modified somewhat truncated diamond shape with midpoint apexes 26 at leading and trailing edges. Diverging from the apexes are two straight line slat edges 28, 29 respectively to the left and right sides of the apex 26. Thus as the belt traverses a curved path, the slat edges 28 on the inner belt curvature abut, and on the outer belt curvature the slat edges 29 are spread apart at the gaps 30. The ribbed fingers 32 integrally attached to the slat forming the conveying surface platform are long enough to provide continuous overlapped interdigitated relationship at the outer belt curvature edge when the belt reaches the maximum curvature defined by the limiting position of the abutted slat edges 28 at the inner belt edge. At the straight portions of the belt transport path the load carried by the belt is not isolated upon free finger tips, since they are supported by the underlying leading or trailing slats. The parallel spacings between the ribs are enough to avoid significant friction and stresses at the inner belt curvature, where they are closest together.

As seen in FIG. 1 and at the bottom left of FIG. 2, the finger tips of the ribbed fingers 32 tend to frictionally contact mating fingers 32 of the respective leading and trailing edges of each chain link module at the inner maximum curvature edge of the belt, typically the shown 24 inch radius R. Similarly at the outer curvature edge of the belt, the fingers 32 tend to frictionally interdigitate in minimal frictional contact at the fingertips.

Also it is seen that the center pair of ribbed fingers 33 at midbelt position converge from a midbelt apex so that the rib fingers on either side of the apex 26 are angled to form two sets of parallel spaced rib fingers having inwardly directed slant angles on opposite edges of the belt. These two sets of hinges interdigitate when the belt traverses a straight pattern seen at the top of FIG. 2, with lateral spacings avoiding significant frictional contact and flexing between the finger tips 32 extending from the respective interdigitated trailing and leading edges of adjacent slats 25. This slanted rib finger structure thus decreases the total frictional contact and avoids some of the operating stresses on the finger portions extending beyond the slat edges 28 as the belt curves at the inner belt edge. In particular at the belt edges, since the leading rib fingers are angled inwardly the chances of interference with objects near the belt edges and the possibility of fracture is reduced.

Figure 3:
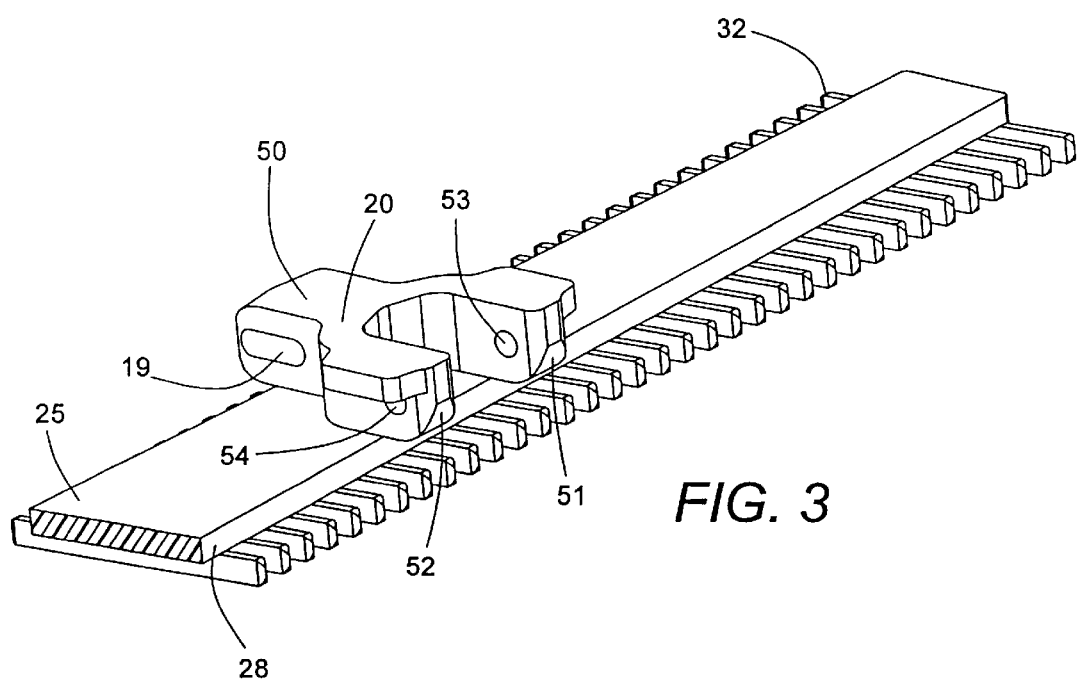
FIG. 3 is a bottom perspective sketch of a simplified link embodiment fragment of the FIG. 2 embodiment showing chain link details on the right half portion of the conveyor width.

In the perspective view of the Y-shaped chain link 20 of FIG. 3, the elongated slot 19 in the base leg 50 is illustrated. This slot permits the belt link 20 to tolerate a degree of lateral pivoting of the belt that aids in traversing curved belt paths. The bifurcated link arms 51, 52, respectively have pivot rod apertures 53, 54. By positioning the chain links 20 intermediate the shown left and the (not shown here) right half of the slat 28, the drive forces are kept away from the belt edges. Thus the chain drive feature carries more loading about curved paths than feasible with light weight conventional modular belts with pivot rods extending across the width of the belt to each belt edge. The set of parallel plastic ribbed fingers 32 form the conveying platform surface by extending upwardly from the plastic body of slat 25.

It is seen that the straight line edges of the slats near the outer edge in the foregoing embodiments expose a significant length of the extending thin finger ribs 32, which are typically one-quarter inch high and one-sixteenths inch thick. Thus as they extend beyond the edge 28 of the slats, they are exposed to the possibility of contacting a foreign object and becoming fractured. The longer rib finger tips could also be subject to some flutter or vibration, which may be reduced by making the finger ends shorter in the regions of heaviest stress by special belt edge slat structure, namely near the outer curvature belt edge.

Figure 4:
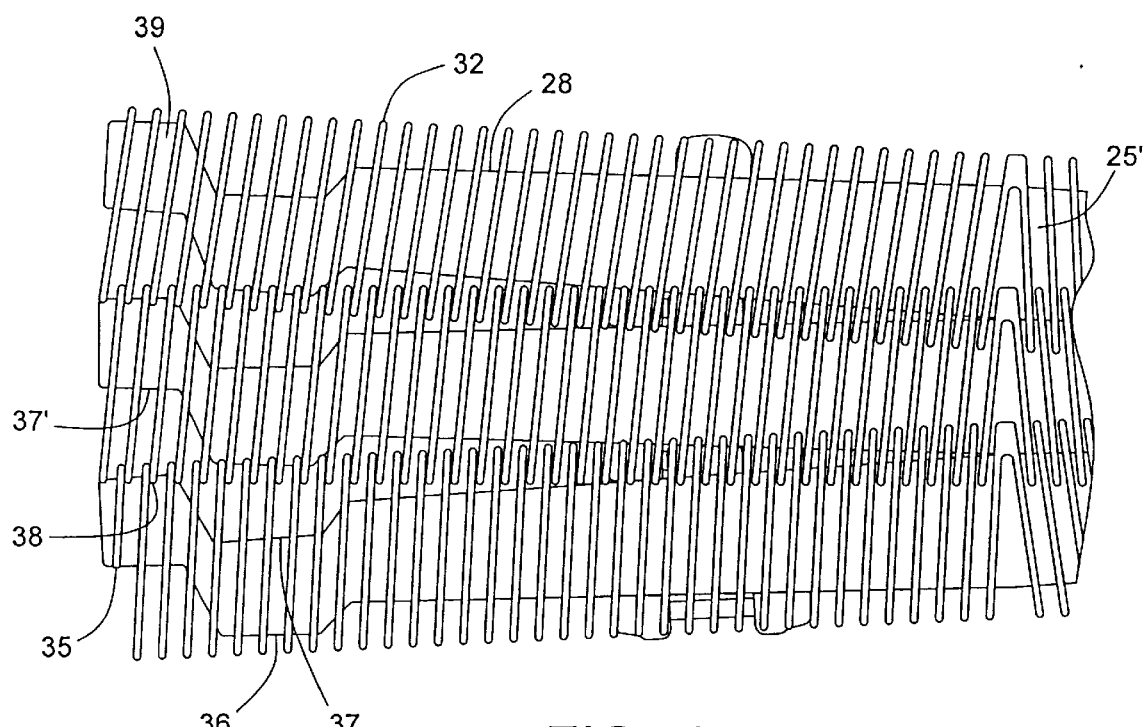
FIGS. 4 and 5 are plan view left belt edge fragments looking into the load bearing surface showing the ribbed finger platform integrally disposed on carrier slats of a subset of three intercoupled chain link modules as they curve about the respective outer and inner curves of a transport path toward the bottom of the figures, showing the positioning of the tooth-notch slat edge configuration near the left edge region of the belt.
Figure 5:
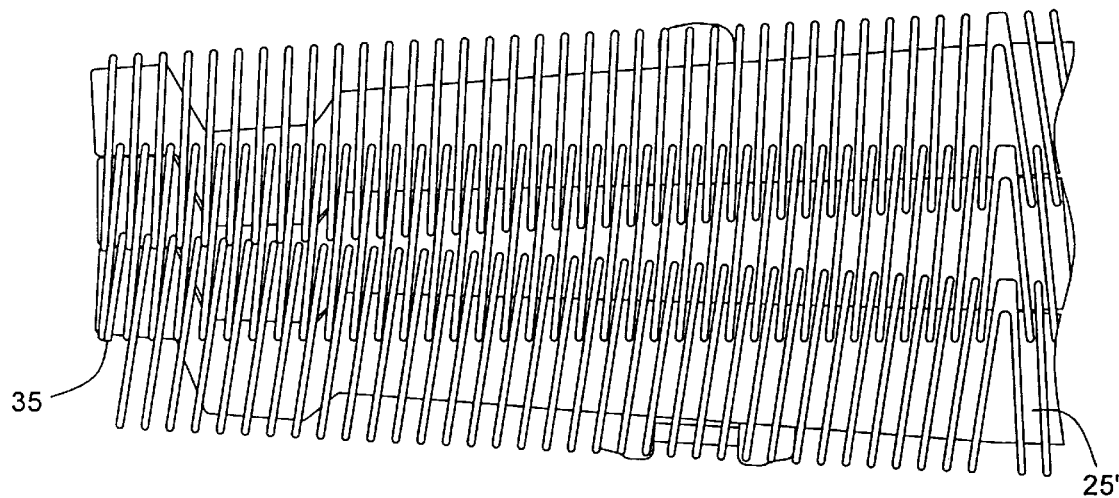

Such finger tips are thus preferably better protected from belt edge stresses, vibration and interference from exterior objects and are less likely to be broken off, in the manner illustrated by the end of the rib finger at location 35 in FIGS. 4 and 5. Accordingly the outer edges of the slats 25' are modified to provide a zig-zagged pattern providing mating teeth 36 and notches 37 that abut as shown in FIG. 5 near the inner curvature of the belt. Note that both the tooth 36 and end tab 39 extend beyond the projected lateral edge of the slats inboard of the edge region in slats 25'. This tooth structure 36, 39 extending beyond the inner edge 28 of the slats 25' thus shortens finger tips 36, 38, which are thereby stiffened to reduce vibration and possibility of fracture. Thus, in the mated internal limiting curvature position of FIG. 5, the outermost teeth on the respective leading and trailing edges of slats 25' are supported and protected by the underlying slat structure, thereby reducing the chance of fracture. The zig-zag slat end region structure of this embodiment provides two teeth and mating notches so that the teeth and notches mate on both the leading and trailing slat edges. Thus the slat end structure comprises support for interdigitated rib fingers near opposite belt edges, which extends closer to finger tips than at positions inboard from the belt edge region.

The slat structure of this embodiment thus at the opposite belt edges comprises generally a zig-zag slat pattern encompassing one tooth on each slat edge. Accordingly at the opposite belt edges, the slats have two teeth 36, 39 extending outwardly and the corresponding notch structure 37, 37' extending inwardly from the slat edges. The teeth and notches of adjacent slats thus mate contiguously when traversing the inside edge of a curved belt path.

Figure 6:
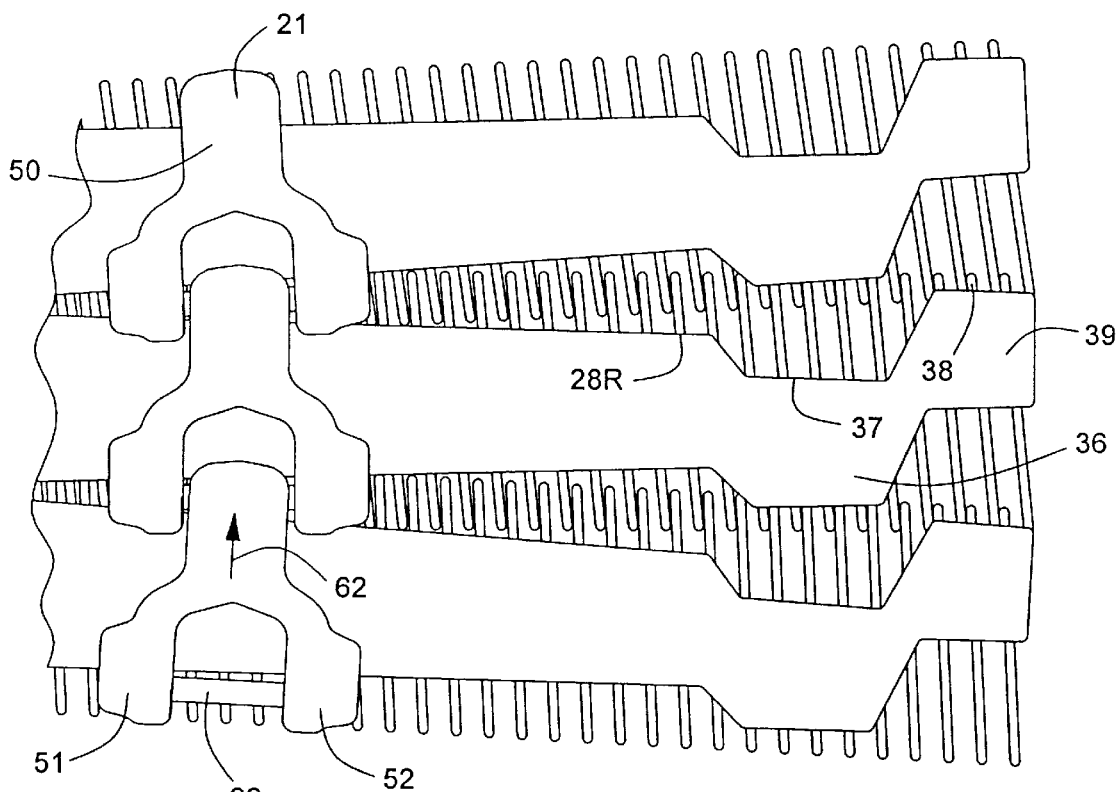
FIGS. 6 and 7 are respective outer and inner belt edge fragment plan views looking at the bottom of the conveyor belt configuration of FIGS. 4 and 5 at the chain link slats transversely extending from the chain links to carry the rib finger platform structure.
Figure 7:
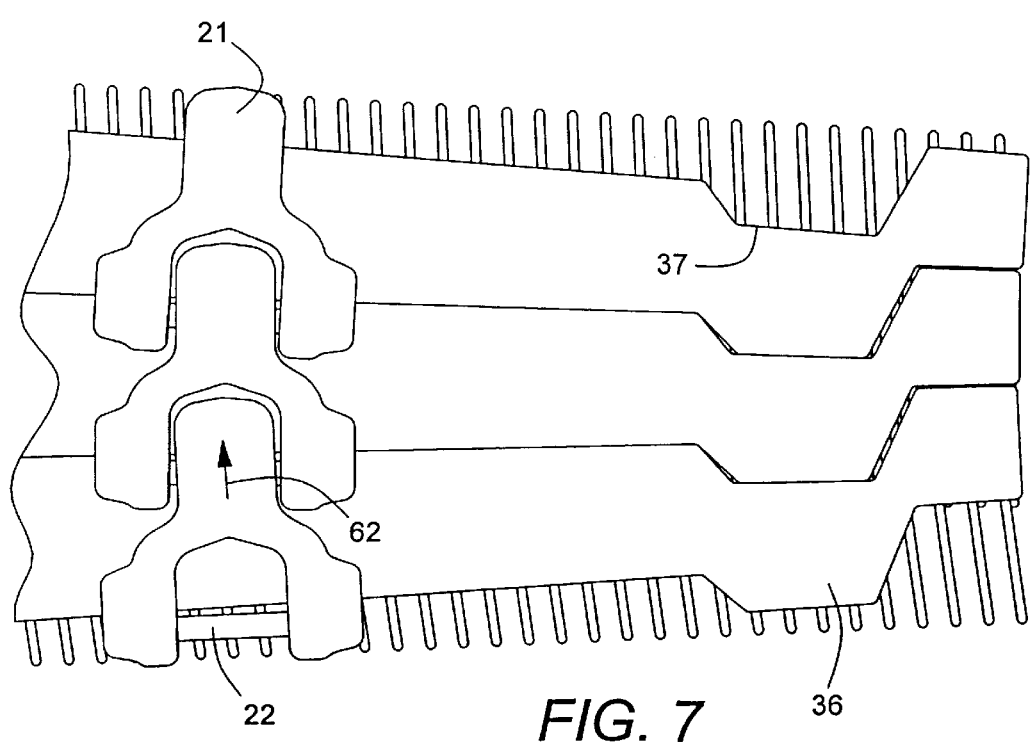

In the belt bottom view of FIGS. 6 and 7, corresponding to the top view of FIGS. 4 and 5, the shortened fingertips 38 extending beyond the slat edge 28R at the right hand belt edge are seen. This shows the belt in tension with the right belt edge respectively going around the outside curve in FIG. 6 and inside curve in FIG. 7 as the sprocket drive mechanism (not shown in this view) pulls the belt in the leading edge direction indicated by the arrows 62. The short pivot rod 22, between the bifurcated chain link arms 51, 52, is shown at the bottom of these figures from the segment of the belt here illustrated.

Figure 8:
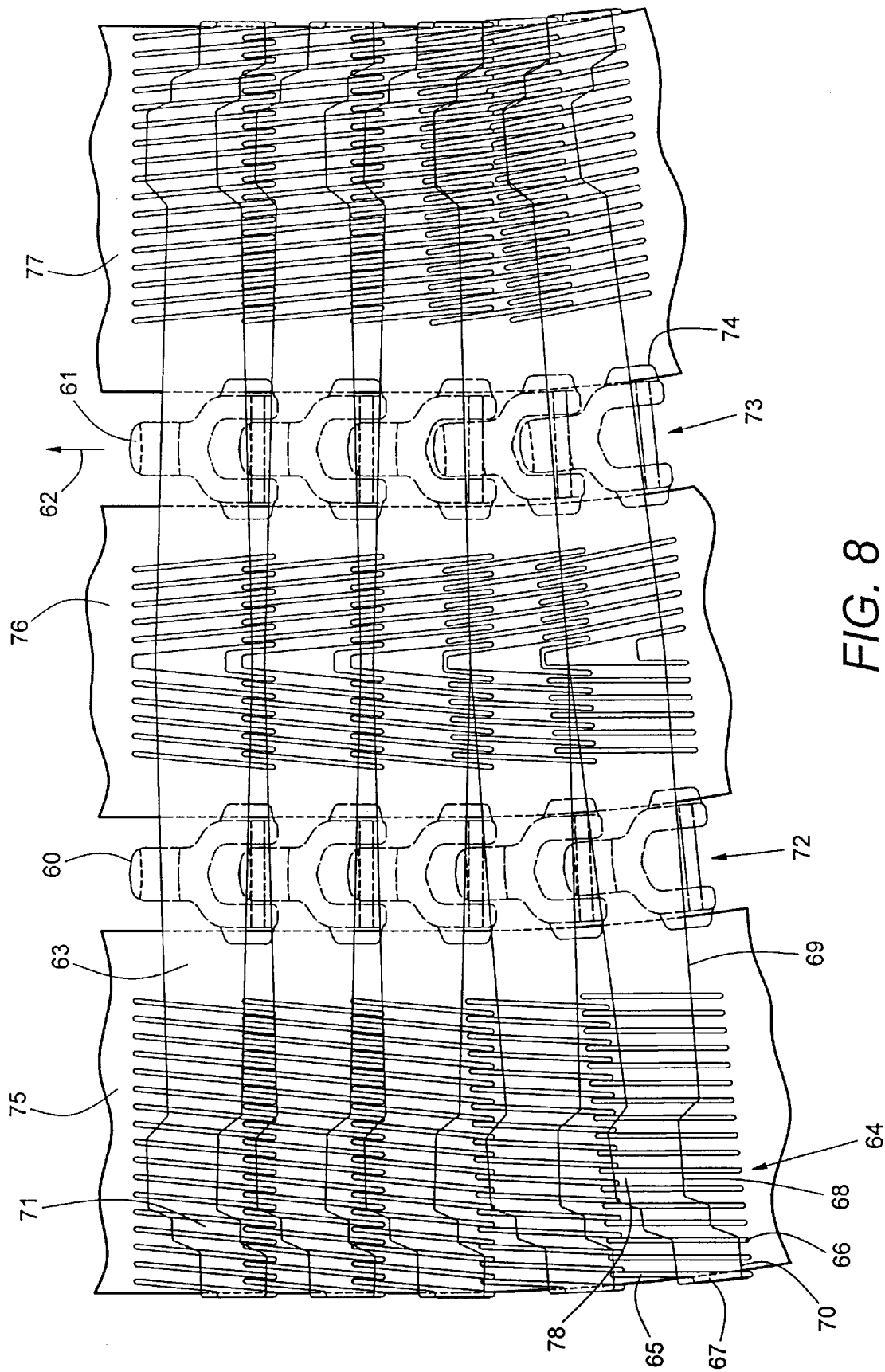
FIG. 8 is a fragmentary plan view sketch of a different conveyor belt embodiment of the invention with the belt ribs omitted alongside the chains to better illustrate the interface with the supporting pan structure upon which the belt rides.

A further embodiment is shown in FIG. 8, which for the purpose of better seeing the chain drive and belt support structure has the rib fingers removed adjacent the two link chains, 60, 61. The conveyor belt is driven in the direction of the arrow 62.

Note the geometrical shape of the notched end portions 64 of the slats 63, which provides nearer the edges of the belt the leading ribs 65 and trailing ribs 66. Also the most vulnerable to snagging outermost trailing rib end 67 is reinforced with a strengthened rib body configuration that rides flush with the belt edge. Note also that the longer leading rib ends are angled away from the belt edges to thereby minimize any chances of interference, snagging, or fracture.

The notched end structure 64 provides a notch 68 indented into the trailing slat edge 69 formating with tooth 78, and a trailing tab tooth 70 extending opposite the travel direction 62 beyond the slat edge 69. The multi-stepped slat structure 71 strengthens the slat end so that it is not so likely to fracture.

The conveyor belt of this embodiment rides on a thin conveyor pan sheet having slots 72, 73 just wide enough for the chain belt to partially extend through the pan. Thus, the chain link flanges 74 extending outboard from the arms of the Y-shaped chain link extend beyond the slot edges to contact the bottom side of the pan thereby keeping the belt down on the pan floor without flapping. The three sections 75, 76, 77 of the conveyor pan typically have low friction sheet plastic wear surfaces of UHMW (ultra-high molecular weight) plastic, which is well known in the industry. This wear pan sheet structure is suitably supported by a framework (not shown).

Figure 9:
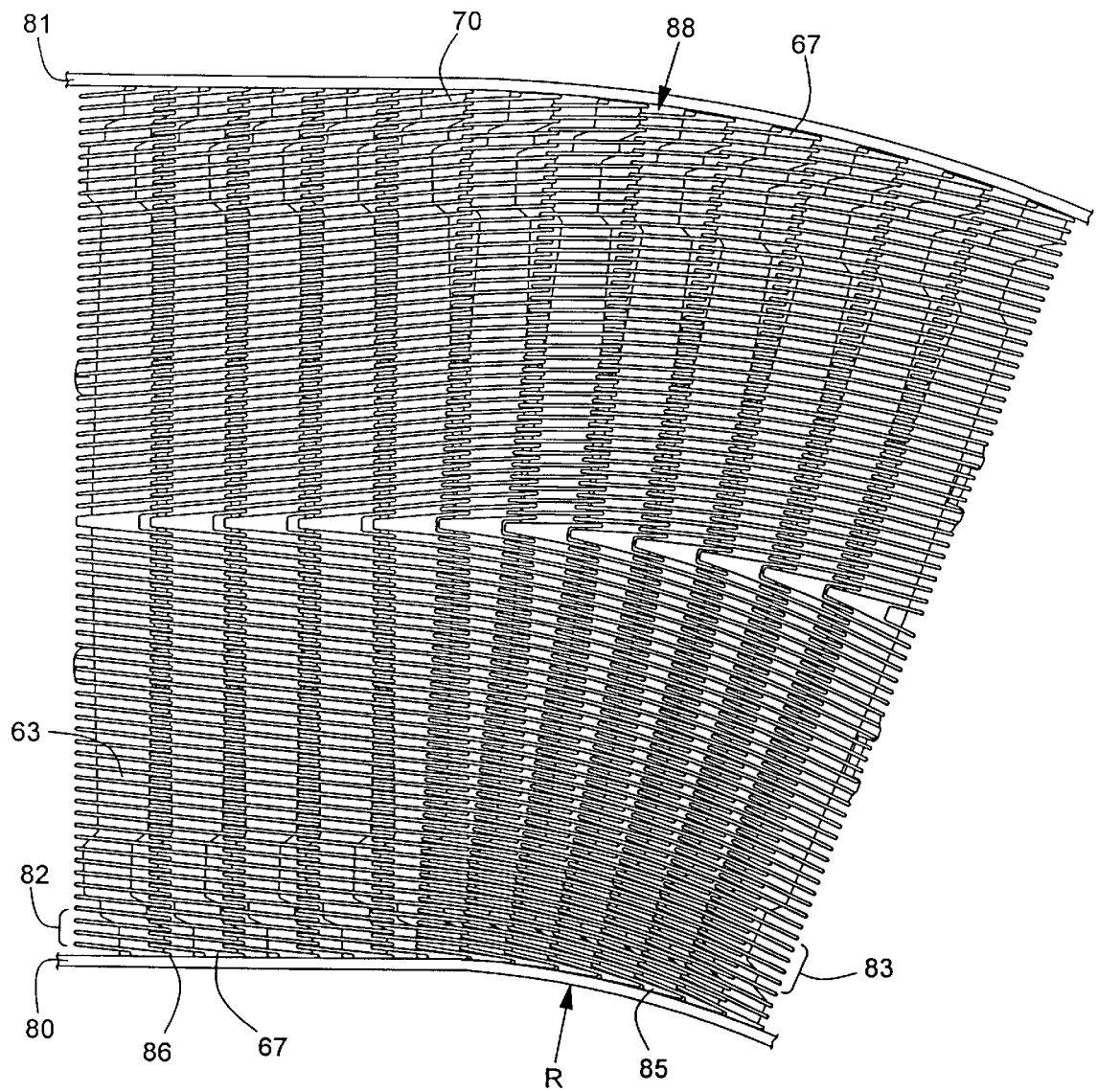
FIG. 9 is a plan view of a curved segment of a conveyor belt embodiment of the invention of the type shown in FIG. 8.

In the curved segment of the conveyor belt embodiment of FIG. 9, it is seen that the reinforced belt edge rib fingers 67 ride against rails 80, 81 on the opposite sides of the belt. The railing thereby confines the belt against lateral movements in transit that would stress the longer leading end and trailing end rib finger tips 82, 83 and induce contact, friction and wear during the life of the belt. At the inner curvature both the longer leading and trailing rib finger tips 82, 83 at the outer edges of the belt overlap the adjacent slats 63 at 85, 86 for support of the load being carried by the belts, as the belt negotiates curves within the specified maximum radius of curvature R. Also near the outer curved edge defined by railing 81, the leading module edges at the longer rib finger tips 82 overlap the trailing tab tooth 70 of the leading slat 63 for support, and the trailing module edges at rib finger tips 83 overlap the trailing slat 63 for support. This occurs at maximum curvature sections of the outer belt rail 81 where the slats diverge in the gaps 88 as well as at the inner belt rail 80 where the slats abut.

Figure 10:
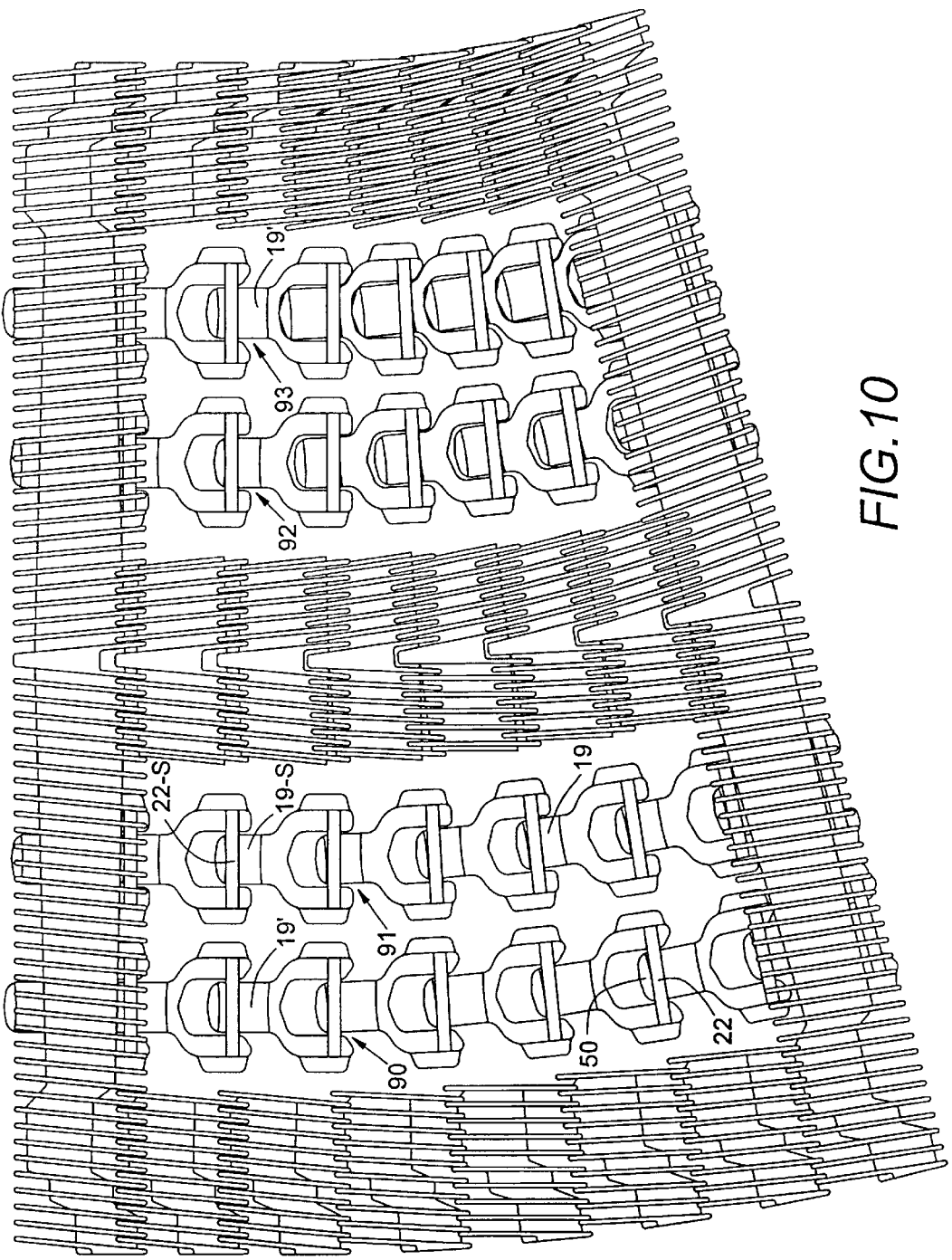
FIG. 10 is a plan view of a curved segment of a conveyor belt embodiment having dual chain drives on the respective right and left sides of the belt wherein part of the rib finger-slat platform structure is omitted to accentuate the role of the chain drive.

As shown in FIG. 10, the chain belt drive arrays on the opposite sides of belt are tandem drive pairs 90, 91 and 92, 93. The drive loads carried by the separate chains 90–93 can be visualized by the relation of the pivot rods 22 in the elongated slots 19 of the chain link base legs 50. Accordingly, it is seen at the top portion of the belt where the drive is in a straight line path, the pivot rod 22-S is at the forefront of the slot 19-S in chains 91 and 92, which thus bear the straight line conveyance load. That is confirmed because the outer chains 90, 93 have the pivot rods 22 idling within the elongated slots 19'. Note that the slots 19' in the links of the outermost belt chains 90, 93 are longer than those of the links 19 of the inner belt chains 91, 92 to compensate for the longer distance to the outer chains 90, 93 travel about the outer belt curvature.

Thus it is seen at the lower curved portion of the belt, at the outer curve on the left, the pivot rods 22 are in driving relationship with the base legs 50 on both chains 90 and 91, thereby sharing peak loads tandemly between the two chains. Thus, the chain links can be designed to carry only the specified straight line belt load capacity which is borne by the inner chains 91, 92 only as the outer chain pivot rods 22 idle. The right hand inner belt curve portion also shows that the pivot rods of both chains 92, 93 are idling in the respective slots 19, 19'.

It is thus seen that the tandemly paired chains of this embodiment can avoid more rugged chain links designed that carry substantially twice the straight line load.

Figure 11:
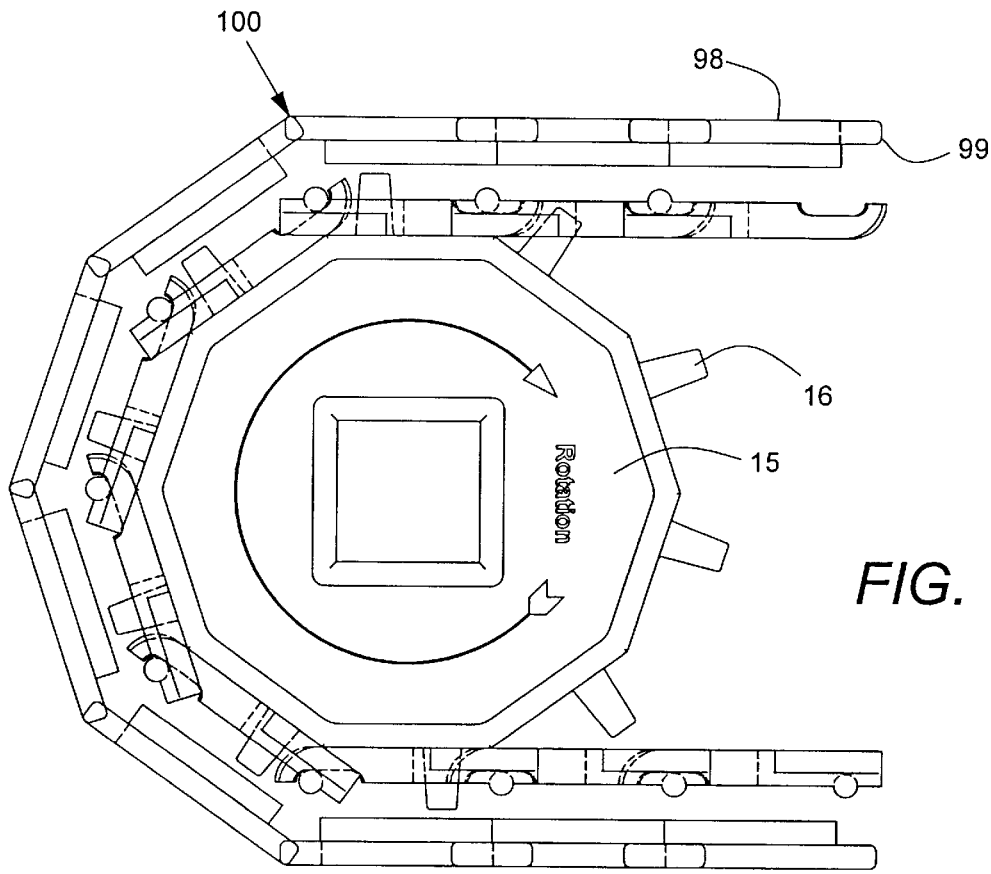
FIG. 11 is a sprocket drive side view fragment.
Figure 12:
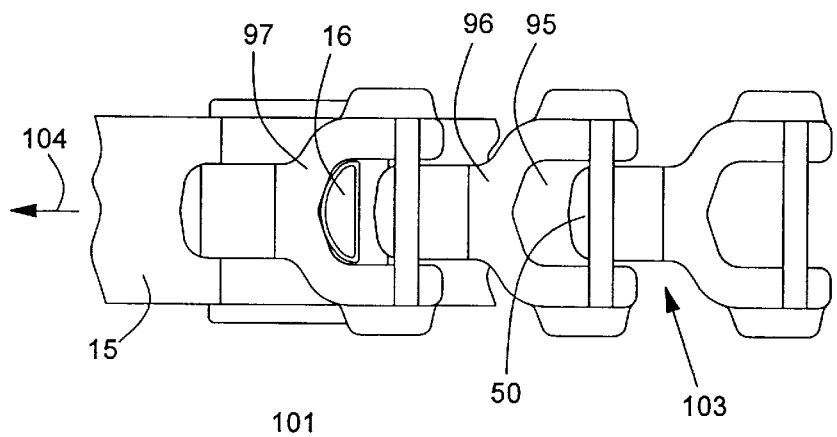
FIG. 12 is a fragmented top view sketch illustrating a single tooth sprocket drive chain portion.
Figure 13:
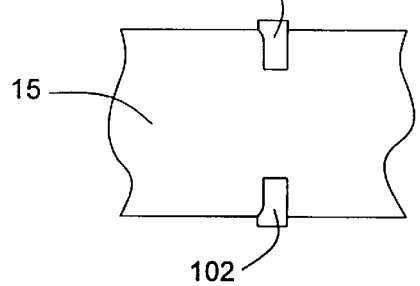
FIG. 13 is a diagrammatic, fragmented top view sketch of a double tooth sprocket drive embodiment.

FIGS. 11, 12 and 13 relate to sprocket drive embodiments for the chain. Thus in the FIG. 12 embodiment the sprocket tooth 16 and sprocket 15 are shown mating into the gap 95 between the base leg 50 of a trailing chain link 96 and the forked receptacle of a leading chain link 97.

From the sprocket side view of FIG. 11, it is seen from the profile of rib 98 that the rounded rib finger tips 99 help the ribs to climb over the adjacent slats as for example at belt location 100.

In the sprocket section 15 shown on the diagrammatic sketch of FIG. 13, it is seen that a further sprocket drive tooth arrangement has teeth 101, 102 on opposite sides. These both have a corresponding shape to mate into the notches 103 (FIG. 12) between leading and trailing links in the belt travel path 104.

From the foregoing embodiments, it is seen that the link chain drive system afforded by this invention is advantageously employed in a variety of conveyor belt configurations which can be designed for appropriate applications, including those requiring the conveyor belt to transport heavy loads.

This invention provides an improved flexible chain link type of conveyor belt system, that has the advantages of providing wider load carrying chain driven belts with light weight modules that traverse curved paths, provided by a dual chain drive system embodiments with two or more parallel drive chains. The invention also solves interference and life problems encountered in light weight modules formed by integral delicate plastic rib finger structure carried by load supporting slats extending laterally across the belt width to provide a substantially planar ribbed carrying surface, and particularly the reduction of potential damage at belt edges where interference with external objects is possible. Short chain pivot rods extending across a very small portion of the belt width considerably reduce problems of pivot rod friction and wear compared with conventional modular conveyor belts having longer pivot rods.

Interdigitating delicate, thin plastic rib finger tips are structured and oriented to avoid snagging and rupture at the belt edges, in part by being directed inwardly from belt edges at the leading module edges. The Y-shaped chain links provide a predetermined degree of slack to permit lateral pivoting of the belt for negotiating curved paths. The laterally extending slats, typically having center leading and trailing apexes, permit abutment of slat edges at the inner belt curvature. Such slats are especially shaped at the belt edge regions for better performance. Thus, for example, mating tabs and notches reduce stress on the rib finger tips from loads carried by the belt by permitting overlap of interdigitating finger tips to rest for support on the adjacent leading and trailing slat foundations on both inner and outer belt edges as the belt curves. The inter-rib finger spacings are preferably chosen as small as feasible to avoid significant contact friction and wear during normal belt operation, while assuring a substantially continuous planar load conveyance surface without voids.

Railings at the belt edges control lateral movements of the modules and thus closely spaced ribs provide a substantially planar conveying surface that can handle heavy loads. The belt modules are supported in a low friction wear pan with a high density plastic wear surface. Interlocking chain link flanges hold the belt modules downwardly in contact with the wear pan surfaces thereby preventing belt flutter in transit.

Several novel features such as assured continuous overlap of the loadbearing platform surface and support of thin flexible fingertips of the ribbed platforms on underlying slat structure, and multiple chain drive systems advance the state of the art to permit transport of heavier loads with light weight plastic modules having thin delicate interdigitating fingertips.

Plastic belts provide an important advantage in this invention because, unlike metals, plastics can endure a high level of stress for a short period and a continuous lower level of stress for very long periods. Thus, lighter belt modules can be provided, curved belt paths generally have most of the belt pathway straight. Also stresses may be divided between multiple chains, as a significant advantage in handling higher load stress incurred at outer curved belt locations. Thus, plastic belt modules can be designed for straight run loading, whereas metal belt modules would have to be designed to handle the maximum overload to be encountered at the curves. Also plastic belts provide low friction when riding on wear pans. Accordingly this invention with plastic belts makes feasible lighter weight plastic belts for given transported loads and reduces friction losses.

Having therefore disclosed novel and improved belt structure and operational features that advance the state of the art, those features of novelty indicative of the spirit and nature of the invention are set forth with particularity in the following claims.

What is claimed is:

1. A flexible conveyor belt system for transporting goods over a transport path including curved path portions, said system having interconnected modular chain link modules carrying load conveying platform sections laterally extending from a chain link to thereby define a belt of predetermined belt width, which belt may be moved over a conveyor belt transport path by transport drive means engaging the chain link structure when the chain link modules are coupled in a chain, said system comprising in combination:

substantially Y shaped chain links having a base leg and two opposed bifurcated arms for pivotally nesting the base legs into the bifurcated arms of an adjacent module along a length of the conveyor belt, said arms being structured for retaining pivot pins for coupling the Y-shaped links together by extending the pivot pins through apertures in the two bifurcated arms and an elongated slot in the leg of an adjacent chain link to afford a predetermined degree of slack in the chain, object carrying substantially planar conveyance platform structure affixed to the chain links by slats extending laterally from the chain links to opposite belt edges for supporting an uppermost conveying surface extending across the belt width, a substantially planar load conveying surface carried by each link being formed from a set of object carrying rib fingers protruding from the slats and extending in leading and trailing directions along the conveyor belt transport path to interdigitate and overlap corresponding rib fingers of leading and trailing modules thereby to establish a substantially continuous ribbed load bearing planar conveying surface along the curved conveyor belt transport path comprising interdigited said object carrying rib fingers, said platform structure comprising support means carrying said rib fingers comprising an elongated base-plate slat panel affixed to a said chain link, said slat panel being integrally sandwiched between the conveying surface rib fingers and the Y-shaped chain link, and being shaped generally longitudinally with intermediate rocker apexes from trailing and leading edges protruding at midbelt positions and converging inwardly from said apexes toward the belt edges with substantially straight leading and trailing edges configured for mating leading and trailing slats upon adjacent belt links over curved belt transport paths at adjacent straight edges thereby to pass the conveyor belt around curves with the converging slat edges in mating contact with each other at one belt edge and spaced from each other to form a gap at the opposite belt edge with said rib fingers providing said substantially continuous ribbed planar conveying surface in the gap, wherein said conveying surface rib fingers on each link further comprise a pair of rib finger elements centered in the belt diverging at the trailing ends at angles to the transport path substantially forming thereby a V shape with apex extending from one slat edge and two converging rib fingers extending from an opposing slat edge, and individual spaced rib finger sets on either side of the pair of rib elements with individual rib fingers disposed parallel to the respective converging fingers of said pair, said spaced rib fingers thereby forming said conveying platforms.

2. The conveyor belt system of claim 1 further comprising at least one intermediate Y-shaped chain drive link on said chain link modules integrally connected to the slats between the apexes and each of the opposite belt edges.

3. The conveyor belt system of claim 1 further comprising two chain drive links connected to said chain link modules on opposite sides of said rocker apexes, wherein said elongated slots in the chain drive links are longer in an outer pair of chain links than in an inner pair of chain links.

4. A flexible conveyor belt system for transporting goods over a transport path including curved path portions, said system having interconnected modular chain link modules carrying load conveying platform sections laterally extending from a chain link to thereby define a belt of predetermined belt width, which belt may be moved over a conveyor belt transport path by transport drive means engaging the chain link structure when the chain link modules are coupled in a chain, said system comprising in combination:

substantially Y shaped chain links having a base leg and two opposed bifurcated arms for pivotally nesting the base legs into the bifurcated arms of an adjacent module along a length of the conveyor belt, said arms being structured for retaining pivot pins for coupling the Y shaped links together by extending the divot pins through apertures in the two bifurcated arms and an elongated slot in the leg of an adjacent chain link to afford a predetermined degree of slack in the chain, object carrying substantially planar conveyance platform structure affixed to the chain links by slats extending laterally from the chain links to opposite belt edges for supporting an uppermost conveying surface extending across the belt width, a substantially planar load conveying surface carried by each link being formed from a set of object carrying rib fingers protruding from the slats and extending in leading and trailing directions along the conveyor belt transport path to interdigitate and overlap corresponding rib fingers of leading and trailing modules thereby to establish a substantially continuous ribbed planar conveying surface along the conveyor belt transport path comprising interdigitated said object carrying rib fingers, and said platform structure comprising support means carrying said rib fingers comprising an elongated base-plate slat panel affixed to a said chain link, said slat panel being integrally sandwiched between the conveying surface rib fingers and the Y-shaped chain link, and being shaped generally longitudinally with intermediate rocker apexes from trailing and leading edges protruding at midbelt positions and converging inwardly from said apexes toward the belt edges with substantially straight leading and trailing edges configured for mating leading and trailing slats upon adjacent belt links over curved belt transport paths at adjacent straight edges thereby to sass the conveyor belt around curves with the converging slat edges in mating contact with each other at one belt edge and spaced from each other at the opposite belt edge wherein said slats near the two opposite edges of the belt form a notch disposed on one slat edge a predetermined distance from the belt edges to define a tooth at the opposing slat edge, thus comprising mating tooth-notch structure on adjacent modules, and wherein said tooth further comprises support members near opposite belt edges from which a set of rib fingers extend with shorter finger tips than at intermediate portions of the slats, thereby to produce a conveying platform surface with shortened rib fingertips supported on the slat base near the belt edges to reduce a tendency to fracture rib finger ends when heavily stressed about curved paths during belt operation.

5. The conveyor belt system of claim 4 further comprising an end tab tooth extending from the slat at the belt edge region for minimizing extending rib finger tip lengths extending beyond the slats, and thereby reducing chances of interference and fracture.

6. In a curved path chain link driven conveyor belt of predetermined width formed of end-to-end modules carrying overlapping load carrying platform structure that laterally extends from chain links, the improvement comprising:

said overlapping platform structure being carried by successive chain links in a drive chain and comprising interdigitated rib fingers extending outwardly in leading and trailing directions of belt travel from platform slat structure carried by each chain link and disposed across the belt width between opposite belt edges, and slat configuration structure for underlying the interdigitated rib fingers in regions near opposite belt edges and extending closer to rib finger tips than at positions intermediate the belt edges.

7. The conveyor belt of claim 6 further comprising interdigitated rib finger structure adjacent the belt edges having rib ends angled inwardly away from the belt edges to thereby minimize chances of interference or fracture.

8. The conveyor belt of claim 6 further comprising reinforced rib finger structure at outermost belt edge rib fingers comprising rib body structure extending flush with the belt edge for frictional engagement with side rails.

9. The belt conveyor of claim 6 adapted to travel over a curved transport path further comprising a slat configuration forming leading and trailing mid-belt apexes and substantially straight edges diverging from the apexes toward the belt edges.

10. The belt conveyor of claim 6 further comprising slat structure near the opposite belt edges forming a tooth extending outwardly from one edge of the slat, and mating notch structure extending inwardly from an adjacent slat edge for receiving the tooth when the belt traverses a curved belt path.

11. The belt conveyor of claim 6 further comprising a toothed tab disposed on said slat inwardly from the outer belt edge configured to extend beyond an inner edge of the slat structure, said tab integrally supporting and underlying rib fingers to extend shorter finger tips therefrom.

12. The belt conveyor of claim 6 further wherein said chain link belt conveyor consists of plastic modular elements.

13. The belt conveyor of claim 6 further comprising belt driving means configured with two drive chains respectively positioned between opposite sides of the conveyor belt and a midbelt location, wherein an outermost pair of drive chains provides for a greater amount of slack along a belt transport path than an innermost pair.

14. The belt conveyor of claim 6 further comprising belt driving means configured with a drive chain respectively positioned between opposite sides of the conveyor belt and a midbelt location.

15. In a curved path chain link belt conveyor of predetermined width having overlapping load carrying surface structure disposed on chain link supported modules having slats laterally extending from supporting chain links to form a load carrying platform extending across said belt width, the improvement comprising: overlapping load carrying surface structure carried by successive chain links comprising interdigitated rib fingers extending beyond two edges of the slats of each module to extend across the belt width between opposite belt edges in both leading and trailing directions of conveyor belt travel, wherein said rib fingers on each chain link are integrally supported by the slats and further comprising two rib fingers centered in the belt forming a V-shaped configuration apexing toward one slat edge with the two rib fingers diverging toward the opposite slat edge, and sets of individual spaced rib fingers on either side of the V-shaped element disposed parallel to the respective diverging fingers thereby to extend away from the center to substantially each belt edge, said spaced rib fingers thereby forming said load carrying platform.

16. The link belt conveyor defined in claim 15 wherein the apex of said V-shaped configuration is pointed in a belt transport direction toward the leading direction of the accompanying slat edge, further comprising: a reinforced outermost rib finger at opposite belt edges on the trailing finger tip adapted to frictionally slide against a side railing member.

17. A link module for a chain conveyor belt of predetermined width comprising in combination:

a substantially Y shaped chain link member having a base leg with an elongated slot for journalling a pivot rod to provide slack in the belt in directions parallel to a belt travel path and further having two bifurcated arms each having a pivot rod aperture, said chain link member being dimensioned for nesting the base legs into the bifurcated arms along the conveyor belt and retaining them in a chain configuration with respective pivot rods extending through the apertures in the bifurcated arms and the elongated slot in the leg, thereby facilitating a predetermined range of movement of the chain links back and forth with enough lateral flexibility for traversing curved belt paths, an object carrying platform slat affixed to the chain link member and laterally extended from two sides of the chain link member and carrying a plurality of spaced rib fingers forming an upper conveying belt surface across the belt width, said rib fingers extending from leading and trailing edges of the slat and being of such length and position to interdigitate and overlap corresponding rib fingers of adjacent leading and trailing links when the chain links are connected in a chain, thereby to form a ribbed substantially planar uppermost platform surface across the width of the conveyor belt which is integrally disposed upon at least one Y-shaped said chain link, said slat being shaped to present apexes at trailing and leading edges protruding at a midbelt position from angularly disposed straight leading and trailing edges diverging inwardly from the apexes wherein said slat further comprises: opposing notch and tooth slat structure at opposed slat leading and trailing edges, with the tooth structure supporting the interdigitated rib finger ends near opposite belt edges closer to tips of the rib fingers to foreshorten said fingers at the belt edges.

18. A link module for a chain conveyor belt of predetermined width comprising in combination:

a substantially Y shaped chain link member having a base leg with an elongated slot for journalling a pivot rod to provide slack in the belt in directions parallel to a belt travel path and further having two bifurcated arms each having a pivot rod aperture, said chain link member being dimensioned for nesting the base legs into the bifurcated arms along the conveyor belt and retaining them in a chain configuration with respective pivot rods extending through the apertures in the bifurcated arms and the elongated slot in the leg, thereby facilitating a predetermined range of movement of the chain links back and forth with enough lateral flexibility for traversing curved belt paths, an object carrying platform slat affixed to the chain link member and laterally extended from two sides of the chain link member and carrying a plurality of spaced rib fingers forming an upper conveying belt surface across the belt width, said rib finders extending from leading and trailing edges of the slat and being of such length and position to interdigitate and overlap corresponding rib fingers of adjacent leading and trailing links when the chain links are connected in a chain, thereby to form a ribbed substantially planar uppermost platform surface across the width of the conveyor belt which is integrally disposed upon at least one Y-shaped said chain link, said slat being shaped to present apexes at trailing and leading edges protruding at a midbelt position from angularly disposed straight leading and trailing edges diverging inwardly from the apexes, wherein said rib fingers further comprise: a V-shaped rib finger array centered between belt edges with an apex extending toward one slot edge and two diverging rib fingers extending toward an opposite slot edge, and sets of individual spaced rib fingers on either side of the V-shaped element disposed parallel to the respective diverging fingers thereby to extend away from the apex at the center to substantially each belt edge, said spaced fingers thereby forming a substantially planar object conveying platform element wherein leading finger ends are angled inwardly away from the belt edges to thereby minimize chances of interference or fracture.

19. A modular chain link conveyor belt having pivotable slat structure extending across the belt carried by chain link driven belt modules structured for permitting the belt to pass along curved transport paths, comprising in combination: at least two chain links configured to transport the belt about curves being integrally attached on respective left and right belt halves to laterally disposed slat structure extending to opposite belt edges thereby constituting a multiple chain drive system for said conveyor belt with the chain links of the respective chains being pivotably coupled end-to-end along the transport path, wherein the slats have tooth and notch structure disposed near lateral edges of the conveyor belt arranged to extend shorter rib finger ends from the tooth structure near the belt edges than in mid-slat locations.

20. A modular chain link driven conveyor belt system comprising in combination, chain link modules connected into a chain drive mechanism for moving the conveyor belt and accompanying conveyed loads along a transport path, said conveyor belt link modules successively connected at chain links of the chain drive mechanism to form a substantially continuous load bearing transport surface with interdigitated rib fingers on the modules overlapping to form the continuous load conveying surface, and slats laterally extending from the chain links to define opposite edges of the conveyor belt and for supporting said rib fingers to provide finger tips extending beyond slat edges for interdigitating to form the continuous transport surface between leading and trailing slat edges, further comprising tooth and notch structure in the slats near the belt edge regions of the slats to dispose shorter rib finger tips adjacent the belt edges.

* * * * *